US011961453B2

(12) United States Patent
Su et al.

(10) Patent No.: US 11,961,453 B2
(45) Date of Patent: Apr. 16, 2024

(54) PIXEL DRIVE CIRCUIT AND DRIVE METHOD THEREOF, DISPLAY PANEL, AND TERMINAL DEVICE

(71) Applicant: Honor Device Co., Ltd., Shenzhen (CN)

(72) Inventors: Yi Su, Shenzhen (CN); Yabin An, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/043,615

(22) PCT Filed: Feb. 14, 2022

(86) PCT No.: PCT/CN2022/076208
§ 371 (c)(1),
(2) Date: Mar. 1, 2023

(87) PCT Pub. No.: WO2022/267491
PCT Pub. Date: Dec. 29, 2022

(65) Prior Publication Data
US 2023/0274692 A1 Aug. 31, 2023

(30) Foreign Application Priority Data
Jun. 22, 2021 (CN) ......................... 202110694418.7

(51) Int. Cl.
*G09G 3/32* (2016.01)

(52) U.S. Cl.
CPC ....... *G09G 3/32* (2013.01); *G09G 2300/0842* (2013.01); *G09G 2310/061* (2013.01);
(Continued)

(58) Field of Classification Search
None
See application file for complete search history.

(56) References Cited

U.S. PATENT DOCUMENTS 10,157,571 B2 12/2018 Zhu et al.
10,699,619 B1 * 6/2020 Ma ........................... G09G 3/20
(Continued)

FOREIGN PATENT DOCUMENTS

CN 104867442 A 8/2015
CN 105096838 A 11/2015
(Continued)

*Primary Examiner* — Matthew Yeung
(74) *Attorney, Agent, or Firm* — Conley Rose, P.C.

(57) ABSTRACT

A pixel drive circuit and a drive method thereof, a display panel, and a terminal device, which are applied to the field of terminal technologies. The pixel drive circuit includes a first reset module, a light-emitting control module, and a drive module, and both the first reset module and the light-emitting control module are connected to a light-emitting control signal terminal, where one of the first reset module and the light-emitting control module is turned on when the light-emitting control signal is at a high level, and the other of the first reset module and the light-emitting control module is turned on when the light-emitting control signal is at a low level. Therefore, by increasing the frequency of the light-emitting control signal to greater than 120 Hz, a problem of a phenomenon of frequent flickering on an image during low-brightness display may be improved.

20 Claims, 7 Drawing Sheets

(52) U.S. Cl.
CPC ............... *G09G 2320/0233* (2013.01); *G09G 2320/0247* (2013.01)

(56) References Cited

U.S. PATENT DOCUMENTS

| | | | | |
|---|---|---|---|---|
| 11,380,257 | B2 * | 7/2022 | Xu | G09G 3/3233 |
| 11,398,186 | B2 | 7/2022 | Toyomura et al. | |
| 11,508,304 | B2 * | 11/2022 | Liu | G09G 3/3233 |
| 11,557,251 | B2 | 1/2023 | Okabe et al. | |
| 2012/0050252 | A1 | 3/2012 | Akimoto et al. | |
| 2018/0190185 | A1 | 7/2018 | Ko et al. | |
| 2019/0371238 | A1 * | 12/2019 | Gao | H10K 59/131 |
| 2020/0234633 | A1 | 7/2020 | Wang et al. | |
| 2021/0110769 | A1 * | 4/2021 | Ueno | G09G 3/3275 |
| 2021/0287605 | A1 * | 9/2021 | Wang | G09G 3/2092 |
| 2022/0069044 | A1 * | 3/2022 | Kwak | G09G 3/3291 |
| 2022/0157251 | A1 * | 5/2022 | Lee | G09G 3/3266 |
| 2022/0230592 | A1 * | 7/2022 | Zhao | G09G 3/3258 |
| 2023/0099387 | A1 * | 3/2023 | Park | G09G 3/32 345/55 |
| 2023/0419893 | A1 | 12/2023 | Wang et al. | |

FOREIGN PATENT DOCUMENTS

| | | | |
|---|---|---|---|
| CN | 205282058 | U | 6/2016 |
| CN | 106935198 | A | 7/2017 |
| CN | 109192140 | A | 1/2019 |
| CN | 110782838 | A | 2/2020 |
| CN | 111710298 | A | 9/2020 |
| CN | 111986612 | A | 11/2020 |
| CN | 112509523 | A | 3/2021 |
| CN | 112562588 | A | 3/2021 |
| CN | 112771603 | A | 5/2021 |
| CN | 112992070 | A | 6/2021 |
| JP | 2019159651 | A1 | 4/2021 |

* cited by examiner

PIXEL DRIVE CIRCUIT AND DRIVE METHOD THEREOF, DISPLAY PANEL, AND TERMINAL DEVICE

CROSS-REFERENCE TO RELATED APPLICATIONS

This application is a U.S. National Stage of International Application No. PCT/CN2022/076208 filed on Feb. 14, 2022, which claims priority to Chinese Patent Application No. 202110694418.7, filed with the China National Intellectual Property Administration on Jun. 22, 2021, both of which are incorporated herein by reference in their entireties.

TECHNICAL FIELD

Embodiments of this application relate to the field of terminal technologies, and in particular, to a pixel drive circuit and a drive method thereof, a display panel, and a terminal device.

BACKGROUND

With the continuous development of the information age, a terminal device such as a mobile phone has become a commonly used tool in people's life and work. A display panel is an important part of the terminal device, and a display effect of the display panel has an important impact on the use of the terminal device.

However, when the terminal device is displayed at low brightness (for example, the brightness is less than 2 nits), a user may easily observe a phenomenon of frequent flickering on an image, which causes eyes of the user prone to fatigue when viewing.

SUMMARY

Embodiments of this application provide a pixel drive circuit and a drive method thereof, a display panel, and a terminal device, which are applied to the terminal device to improve a problem of frequent flickering on an image during low-brightness display.

According to a first aspect, the embodiments of this application provide a pixel drive circuit, applied to drive a light-emitting device to emit light, where the pixel drive circuit includes: a first reset module, a light-emitting control module, and a drive module, where the first reset module is respectively connected to a light-emitting control signal terminal, a first initialization signal terminal, and a first terminal of the light-emitting device, and is configured to be turned on under control of a light-emitting control signal inputted at the light-emitting control signal terminal, and reset the first terminal of the light-emitting device through a first initialization signal inputted at the first initialization signal terminal; the light-emitting control module is respectively connected to the light-emitting control signal terminal, the drive module, and the first terminal of the light-emitting device, and is configured to be turned on under control of the light-emitting control signal inputted at the light-emitting control signal terminal, and drive the light-emitting device through the drive module to emit light; one of the first reset module and the light-emitting control module is turned on in a case that the light-emitting control signal is at a high level, and the other of the first reset module and the light-emitting control module is turned on in a case that the light-emitting control signal is at a low level; and a frequency of the light-emitting control signal is greater than 120 HZ.

The pixel drive circuit of this application includes a first reset module, a light-emitting control module, and a drive module, and both the first reset module and the light-emitting control module are connected to a light-emitting control signal terminal, where one of the first reset module and the light-emitting control module is turned on when the light-emitting control signal is at a high level, and the other of the first reset module and the light-emitting control module is turned on when the light-emitting control signal is at a low level. Therefore, by increasing the frequency of the light-emitting control signal to greater than 120 Hz, the problem of frequent flickering on the image during low-brightness display may be improved, and a phenomenon that eyes are prone to fatigue when a user views is reduced.

Optionally, the light-emitting control module includes a first light-emitting control unit and a second light-emitting control unit, where a control terminal of the first light-emitting control unit is connected to the light-emitting control signal terminal, a first terminal of the first light-emitting control unit is connected to a first voltage signal terminal, and a second terminal of the first light-emitting control unit is connected to a first terminal of the drive module; and a control terminal of the second light-emitting control unit is connected to the light-emitting control signal terminal, a first terminal of the second light-emitting control unit is connected to a second terminal of the drive module, and a second terminal of the second light-emitting control unit is connected to the first terminal of the light-emitting device. The light-emitting device is jointly controlled by the first light-emitting control unit and the second light-emitting control unit to emit light.

Optionally, the first reset module includes a first reset transistor, a gate of the first reset transistor is connected to the light-emitting control signal terminal, a first electrode of the first reset transistor is connected to the first initialization signal terminal, and a second electrode of the first reset transistor is connected to the first terminal of the light-emitting device; the first light-emitting control unit includes a first light-emitting control transistor, a gate of the first light-emitting control transistor is connected to the light-emitting control signal terminal, a first electrode of the first light-emitting control transistor is connected to the first voltage signal terminal, and a second electrode of the first light-emitting control transistor is connected to the first terminal of the drive module; and the second light-emitting control unit includes a second light-emitting control transistor, a gate of the second light-emitting control transistor is connected to the light-emitting control signal terminal, a first electrode of the second light-emitting control transistor is connected to the second terminal of the drive module, and a second electrode of the second light-emitting control transistor is connected to the first terminal of the light-emitting device.

Optionally, the first reset transistor is an N-type transistor, and both the first light-emitting control transistor and the second light-emitting control transistor are P-type transistors. By changing the rust reset transistor from the P-type transistor to the N-type transistor, and maintaining types of the first light-emitting control transistor and the second light-emitting control transistor unchanged, change of the pixel drive circuit is reduced, to prevent increase of manufacturing difficulty due to too much change of the pixel drive circuit.

Optionally, the first reset transistor is a P-type transistor, and both the first light-emitting control transistor and the second light-emitting control transistor are N-type transistors. By changing the first light-emitting control transistor and the second light-emitting control transistor from the P-type transistors to the N-type transistors, and maintaining a type of the first reset transistor unchanged, a time that the light-emitting control signal is at a high level is reduced, to reduce power consumption caused by the light-emitting control signal being at the high level for a long time.

Optionally, the drive module includes a drive transistor, a first electrode of the drive transistor is connected to the second terminal of the first light-emitting control unit, and a second electrode of the drive transistor is connected to the first terminal of the second light-emitting control unit.

Optionally, the pixel drive circuit further includes: a data write module, a second reset module, a threshold compensation module, and a storage module, where the second reset module is respectively connected to a reset signal terminal, a second initialization signal terminal, and a control terminal of the drive module, and is configured to be turned on under control of a reset signal inputted at the reset signal terminal, and reset the control terminal of the drive module through a second initialization signal inputted at the second initialization signal terminal; the data write module is respectively connected to a first scan signal terminal, a data signal terminal. and the first terminal of the drive module, and is configured to be turned on under control of a first scan signal inputted at the first scan signal terminal, and write a data signal inputted at the data signal terminal to the drive module; the threshold compensation module is respectively connected to a second scan signal terminal, the second terminal of the drive module, and the control terminal of the drive module, and is configured to be turned on under control of a second scan signal inputted at the second scan signal terminal, and compensate for a threshold voltage of the drive module; and the storage module is respectively connected to the first voltage signal terminal and the control terminal of the drive module, and is configured to stabilize a voltage of the control terminal of the drive module. Based on the second reset module, the control terminal of the drive module is reset, to prevent influence of a residual charge of a previous frame on the display. Based on compensation performed on the threshold voltage of the drive module by the threshold compensation module, a problem of uneven display caused by threshold voltage drift is improved.

Optionally, the data write module includes a data write transistor, a gate of the data write transistor is connected to the first scan signal terminal, and a first electrode of the data write transistor is connected to the data signal terminal, and a second electrode of the data write transistor is connected to the first terminal of the drive module.

Optionally, the second reset module includes a second reset transistor, a gate of the second reset transistor is connected to the reset signal terminal, a first electrode of the second reset transistor is connected to the second initialization signal terminal, and a second electrode of the second reset transistor is connected to the control terminal of the drive module.

Optionally, the threshold compensation module includes a compensation transistor, a gate of the compensation transistor is connected to the second scan signal terminal, a first electrode of the compensation transistor is connected to the second terminal of the drive module, and a second electrode of the compensation transistor is connected to the control terminal of the drive module.

Optionally, the storage module includes a storage capacitor, a first electrode plate of the storage capacitor is connected to the first voltage signal terminal, and a second electrode plate of the storage capacitor is connected to the control terminal of the drive module.

According to a second aspect, the embodiments of this application provide a drive method, applied to drive the pixel drive circuit, and the drive method includes: in a reset stage, turning on a first reset module to reset a first terminal of a light-emitting device; in a data write stage, turning on the first reset module to reset the first terminal of the light-emitting device; and in a light-emitting control stage, turning on a light-emitting control module, and driving the light-emitting device through a drive module to emit light.

According to a third aspect, the embodiments of this application provide a display panel, including a plurality of pixel drive circuits, and a light-emitting device connected to each of the plurality of pixel drive circuits.

According to a fourth aspect, the embodiments of this application provide a terminal device, including a housing and a display panel, and the display panel is mounted on the housing.

It should be understood that the second aspect to the fourth aspect of this application correspond to the technical solution of the first aspect of this application, and the beneficial effects obtained by each aspect and the corresponding feasible implementations are similar. Details are not repeated herein again.

DESCRIPTION OF EMBODIMENTS

For ease of describing the technical solutions in the embodiments of this application clearly, in the embodiments of this application, words such as “first” and “second” are used to distinguish same or similar items with a basically same function and role. For example, a first chip and a second chip are only configured to distinguish different chips, and their sequence is not limited. A person skilled in the art may understand that the terms "first", "second", and the like, and do not limit a quantity and an execution order, and the terms "first", "second", and the like are not limited to be necessarily different.

It should be noted that in the embodiments of this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "example" or "for example" or the like is intended to present a related concept in a specific manner.

In this embodiment of this application, "at least one" means one or more, and "a plurality of" means two or more. "And/or" describes an association relationship for associated objects and represents that three relationships may exist. For example, A and/or B may represent: only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

Figure 1:
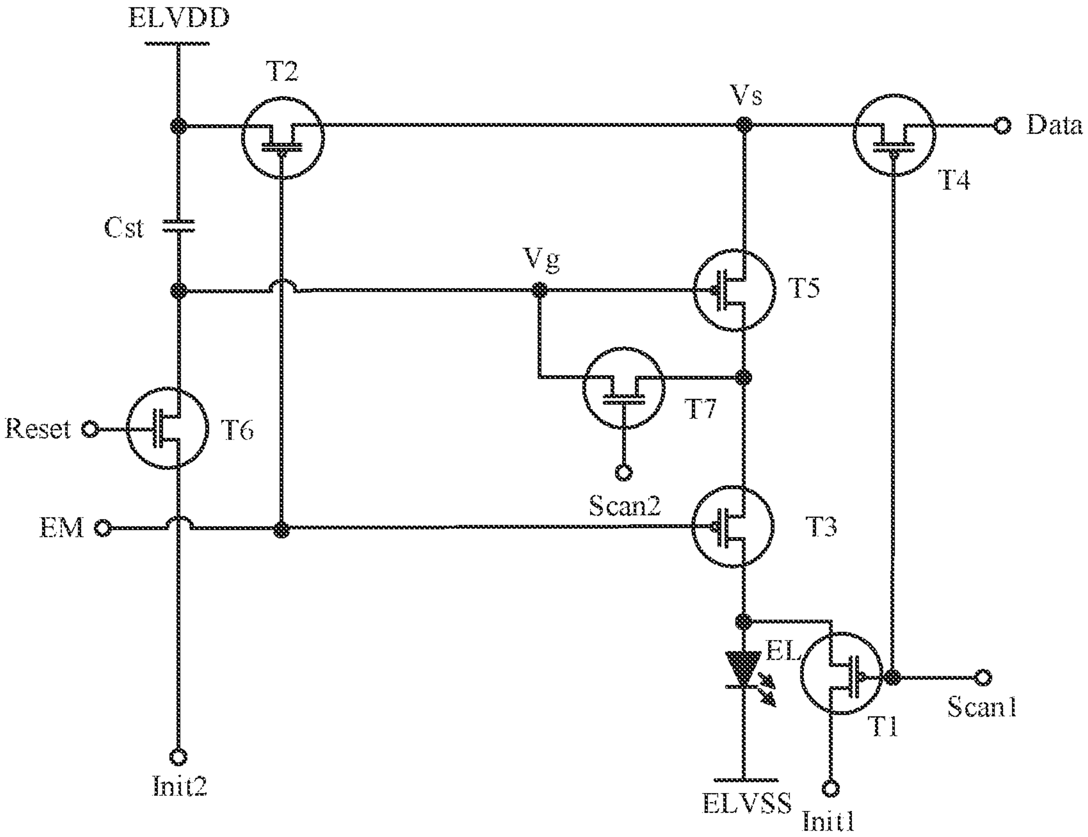
FIG. 1 is a circuit diagram of a pixel drive circuit in the related art.

In the related art, as shown in FIG. 1, the pixel drive circuit includes a first reset transistor T1, a first light-emitting control transistor T2, a second light-emitting control transistor T3, a data write transistor T4, a drive transistor T5, a second reset transistor T6, a compensation transistor T7, and a storage capacitor Cst.

The first reset transistor T1 is a P-type transistor, both a gate of the first reset transistor T1 and a gate of the data write transistor T4 are connected to a first scan signal terminal Scan1, the first reset transistor T1 is configured to be conducted when a first scan signal inputted at the first scan signal terminal Scan1 is at a low level, and an anode of a light-emitting device EL is reset through a first initialization signal inputted at a first initialization signal terminal Init1; and both the first light-emitting control transistor T2 and the second light-emitting control transistor T3 are also P-type transistors, both a gate of the first light-emitting control transistor T2 and a gate of the second light-emitting control transistor T3 are connected to a light-emitting control signal terminal EM, are configured to be conducted when a light-emitting control signal inputted at the light-emitting control signal terminal EM is at a low level, and drive the light-emitting device EL through the drive transistor T5 to emit light.

In a terminal device, when a display panel displays at low brightness, the display panel usually adopts a pulse width modulation (Pulse Width Modulation, PWM) dimming technology to adjust display brightness. Specifically, by adjusting a duty cycle of the light-emitting control signal inputted at the light-emitting control signal terminal EM, a light-emitting duration of the light-emitting device EL is controlled, to adjust display brightness of the light-emitting device EL. The duty cycle refers to a ratio of a duration of an active level (that is, a level at which the first light-emitting control transistor T2 and the second light-emitting control transistor T3 are controlled to be conducted) to a duration of a cycle of the light-emitting control signal in one cycle of the light-emitting control signal. A light-emitting duration of the light-emitting device EL in a process of displaying a frame of image is positively correlated with a duty cycle of the light-emitting control signal. That is, the greater the duty cycle of the light-emitting control signal is, the longer the light-emitting duration of the light-emitting device EL is in a process of displaying a frame of image, and the smaller the duty cycle of the light emitting control signal is, the shorter the light-emitting duration of the light-emitting device EL is in the process of displaying a frame of image.

However, when the display panel is displayed at low brightness, because the duty cycle of the light-emitting control signal is very small, the light-emitting duration of the light-emitting device EL in the process of displaying a frame of image is very short, and the user may easily observe a phenomenon of frequent flickering on the image, which causes eyes of the user to prone to fatigue when viewing.

To improve the phenomenon of frequent flickering, in another related technology, a frequency of the light-emitting control signal is increased from the original 120 HZ to 240 HZ, and the frequency of the light-emitting control signal is increased to improve the problem of frequent flickering during low-brightness display. However, because the first scan signal inputted at the first scan signal terminal Scan1 is 120 Hz, the frequency of the light-emitting control signal is twice the frequency of the first scan signal, so that the first scan signal and the light-emitting control signal are not completely synchronized. Therefore, every time the first scan signal goes through one cycle, the light-emitting control signal goes through two cycles. For example, as shown in FIG. 2, a duration of a cycle of the first scan signal is 8.3 ms, and a duration of a cycle of the light-emitting control signal is 4.15 ms.

Figure 2:
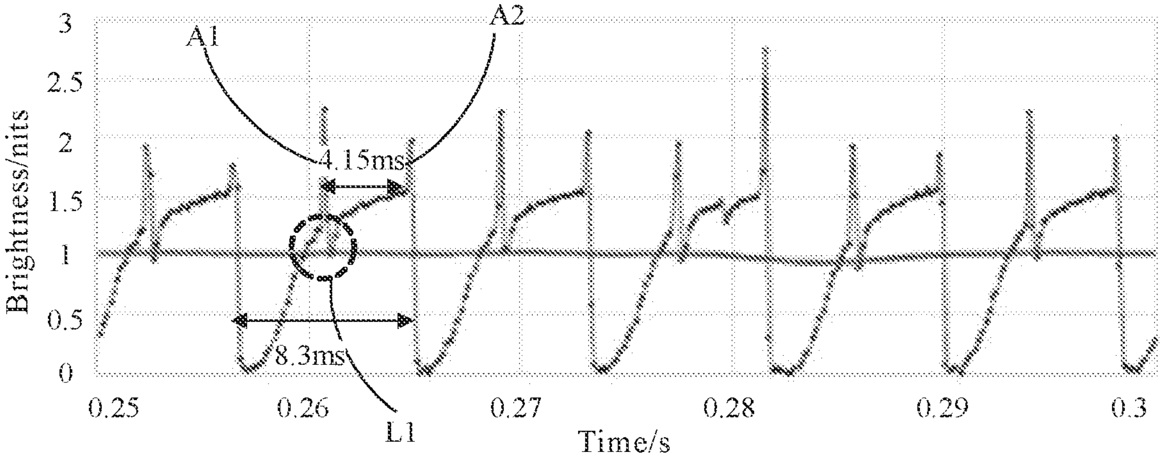
FIG. 2 is a schematic diagram of a brightness curve when a pixel drive circuit shown in FIG. 1 drives a light-emitting device to emit light.

As shown in FIG. 2, when the first scan signal and the light-emitting control signal are not synchronized, that is, at a moment A1, the light-emitting control signal changes from a low level to a high level, so that the first light-emitting control transistor T2 and the second light-emitting control transistor T3 change from a conducted state to an off state to reduce brightness of the light-emitting device EL. However, in this case, the first scan signal is still maintained at the high level and does not change, so that the first reset transistor T1 is still in the off state. The first reset transistor T1 cannot reset the anode of the light-emitting device EL, so that the brightness of the light-emitting device EL is not reduced to 0 nits, and the brightness L1 of the light-emitting device EL may only be reduced to 1 nits; and when the first scan signal and the light-emitting control signal are synchronized, that is, at a moment A2, the light-emitting control signal changes from the low level to the high level, so that the first light-emitting control transistor T2 and the second light-emitting control transistor T3 change from the conducted state to the off state. In this case, the first scan signal also changes from the high level to the low level, so that the first reset transistor T1 changes from the off state to the conducted state. The first reset transistor T1 resets the anode of the light-emitting device EL, so that in this case, the brightness of the light-emitting device EL may be reduced to 0 nits.

Therefore, by increasing the frequency of the light-emitting control signal to 240 HZ, while the frequency of the first scan signal is still 120 HZ, it causes reduced brightness of the light-emitting device EL corresponding to the light-emitting control signal to be inconsistent in two adjacent cycles. As a result, during low-brightness display, only increasing the frequency of the light-emitting control signal does not significantly improve the flickering on the image.

Based on this, the embodiments of this application provide a pixel drive circuit. By connecting both the light-emitting control module and the first reset module that resets the light-emitting device to the light-emitting control signal terminal EM, one of the light-emitting control module and the first reset module is turned on when the light-emitting control signal is at the high level, and the other of the light-emitting control module and the first reset module is turned on when the light-emitting control signal is at the low level, so that when the light-emitting control module is turned off, the first reset module that resets the light-emitting device EL may be synchronously turned on. That is, the first reset module and the light-emitting control module may reduce a voltage of the first terminal of the light-emitting device EL at the same frequency, so that the light-emitting control signal may reduce the brightness of the corresponding light-emitting device EL to 0 nits in each cycle; and in addition, if the frequency of the light-emitting control signal is increased to greater than 120 HZ, a change frequency of a light state and a change frequency of a dark state of the light-emitting device EL when a frame of image is displayed are increased accordingly, so as to improve the problem of the phenomenon of frequent flickering on the image during low-brightness display, and reduce the phenomenon that eyes of the user are prone to fatigue when viewing.

The pixel drive circuit provided in the embodiments of this application may be applied in a terminal device with a display function. The terminal device may be a device such as a mobile phone, a tablet computer, an e-reader, a notebook computer, an in-vehicle device, a wearable device, a television, or the like.

Figure 3:
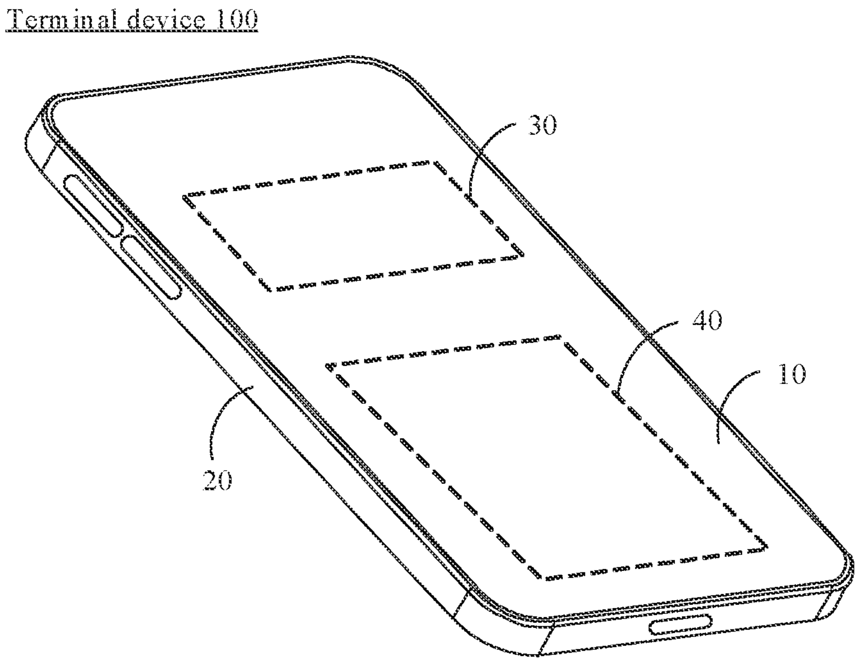
FIG. 3 is a schematic structural diagram of a terminal device according to an embodiment of this application.

As shown in FIG. 3, the terminal device 100 includes a display panel 10, a housing 20, a circuit board 30, and a battery 40. The display panel 10 is mounted on the housing 20, and is configured to display an image or a video, or the like, and the display panel 10 and the housing 20 together surround to form an accommodating cavity of the terminal device 100, so as to place electronic components of the terminal device 100 through the accommodating cavity, and simultaneously form a function of sealing and protecting electronic components in the accommodating cavity. For example, the circuit board 30 and the battery 40 of the terminal device 100 are located in the accommodating cavity.

The circuit board 30 may be a main board of the terminal device 100, and one or more function components such as a processor, a memory, a camera, a motor, a gyroscope sensor, and an acceleration sensor may be integrated on the circuit board 30. The display panel 10 is electrically connected to the circuit board 30, so as to control a display of the display panel 10 through a processor on the circuit board 30; and the battery 40 is also electrically connected to the circuit board 30, and supplies power to the terminal device through the battery 40. Specifically, a power supply management module is arranged on the circuit board 30, the power supply management module receives an input of the battery 40, and supplies power to each electronic component arranged in the terminal device. For example, the battery 40 supplies power to a processor, a memory, a display panel 10, and a camera through the power supply management module.

Figure 4:
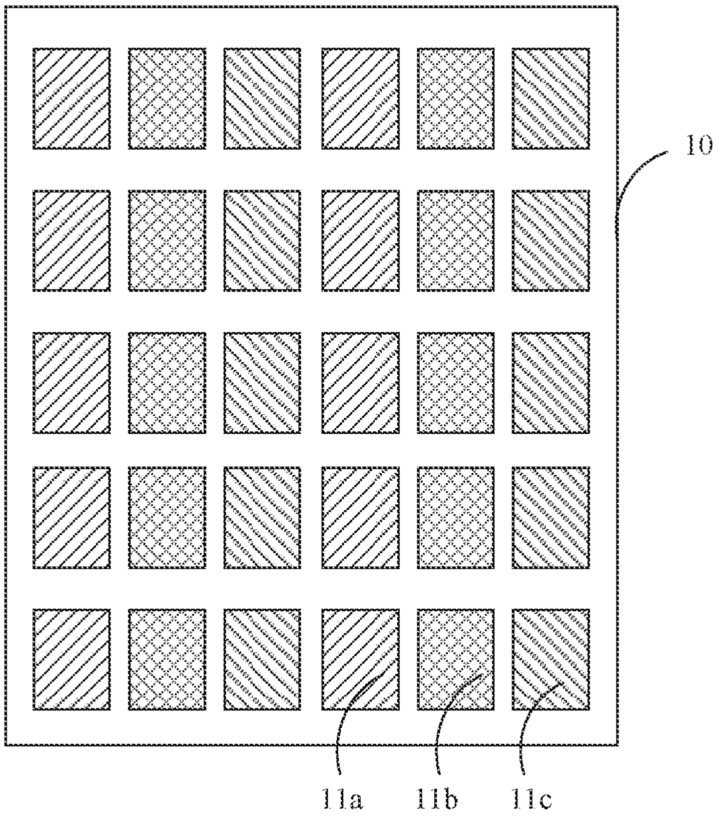
FIG. 4 is a schematic structural diagram of a display panel according to an embodiment of this application.

As shown in FIG. 4, the display panel 10 includes a plurality of pixel units distributed in an array. Each pixel unit includes a plurality of sub-pixels. For example, each pixel unit includes a first sub-pixel 11*a*, a second sub-pixel 11*b*, and a third sub-pixel 11*c*. The first sub-pixel 11*a* may be a red sub-pixel, the second sub-pixel 11*b* may be a green sub-pixel, and the third sub-pixel 11*c* may be a blue sub-pixel.

In addition, each sub-pixel includes a pixel drive circuit, and a light-emitting device connected to each pixel drive circuit. The light-emitting device may be an organic light-emitting diode (organic light-emitting diode, OLED), a Miniled (Miniled), a MicroLed (MicroLed), a quantum dot light-emitting diodes (quantum dot light-emitting diode, QLED), or the like. In some embodiments, the terminal device 100 may include one or N display panels 10, where N is a positive integer greater than 1.

It should be noted that the pixel drive circuit of each sub-pixel is basically similar, but the light-emitting device connected to the pixel drive circuit of each sub-pixel is different. When a color of light emitted by the light-emitting device in the sub-pixel is red, the sub-pixel is a red sub-pixel. When a color of light emitted by the light-emitting device in the sub-pixel is green, the sub-pixel is a green sub-pixel. When a color of light emitted by the light-emitting device in the sub-pixel is blue, the sub-pixel is a blue sub-pixel.

Figure 5:
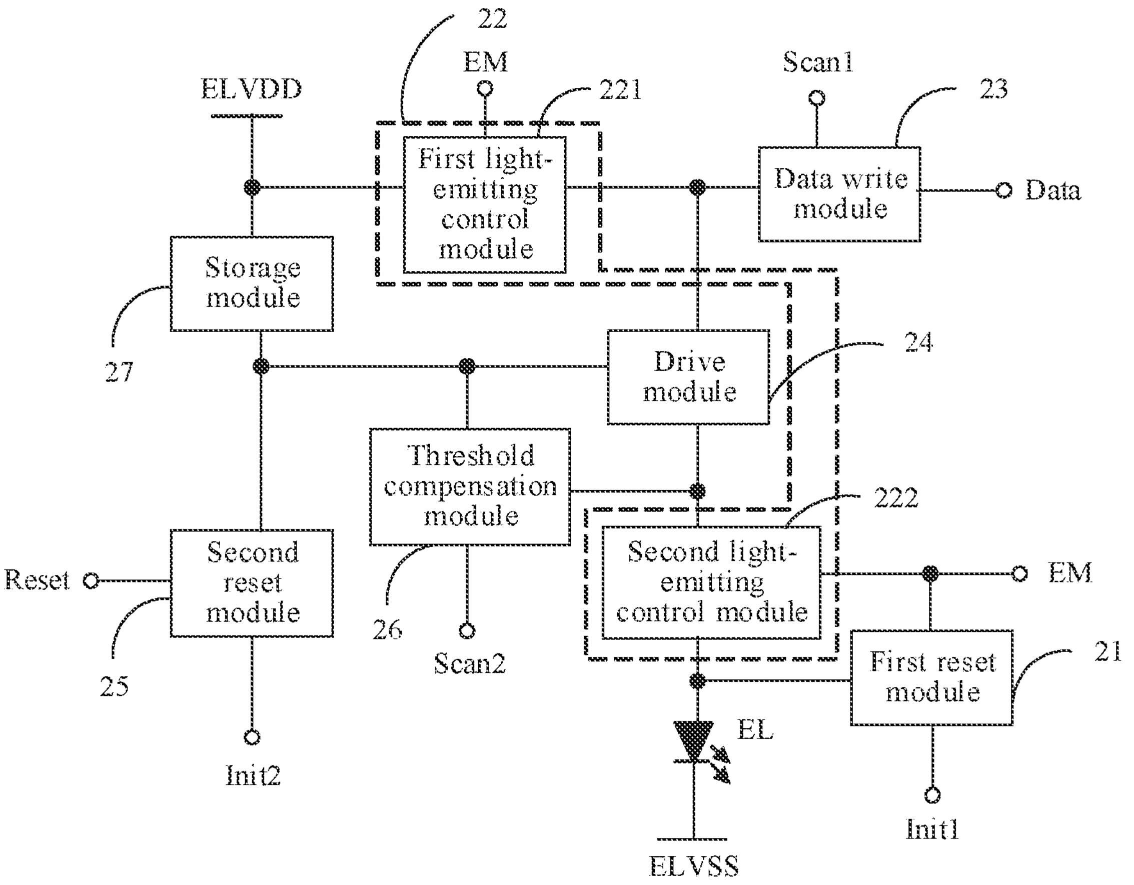
FIG. 5 is a schematic structural diagram of a pixel drive circuit according to an embodiment of this application.

As shown in FIG. 5, the pixel drive circuit in each sub-pixel includes: a first reset module 21, a light-emitting control module 22, a data write module 23, a drive module 24, a second reset module 25, a threshold compensation module 26, and a storage module 27.

The second reset module 25 is respectively connected to a reset signal terminal Reset, a second initialization signal terminal Init2, and a control terminal of the drive module 24, and is configured to be turned on under control of a reset signal inputted at the reset signal terminal Reset, and reset the control terminal of the drive module 24 through a second initialization signal inputted at the second initialization signal terminal Init2; the data write module 23 is respectively connected to a first scan signal terminal Scan1, a data signal terminal Data, and the first terminal of the drive module 24, and is configured to be turned on under control of a first scan signal inputted at the first scan signal terminal Scan1, and write a data signal inputted at the data signal terminal Data to the drive module 24; the threshold compensation module 26 is respectively connected to a second scan signal terminal Scan2, the second terminal of the drive module 24, and the control terminal of the drive module 24, and is configured to be turned on under control of a second scan signal inputted at the second scan signal terminal Scan2, and compensate for a threshold voltage of the drive module 24; the storage module 27 is respectively connected to the first voltage signal terminal ELVDD and the control terminal of the drive module 24, and is configured to stabilize a voltage of the control terminal of the drive module 24; the first reset module 21 is respectively connected to a light-emitting control signal terminal EM, a first initialization signal terminal Init1, and a first terminal of the light-emitting device EL, and is configured to be turned on under control of a light-emitting control signal inputted at the light-emitting control signal terminal EM, and reset the first terminal of the light-emitting device EL through a first initialization signal inputted at the first initialization signal terminal Init1; and the light-emitting control module 22 is respectively connected to the light-emitting control signal terminal EM, the drive module 24, and the first terminal of the light-emitting device EL, and is configured to be turned on under control of the light-emitting control signal inputted at the light-emitting control signal terminal EM, and drive the light-emitting device EL through the drive module 24 to emit light.

One of the first reset module 21 and the light-emitting control module 22 is turned on in a case that the light-emitting control signal is at a high level, and the other of the first reset module 21 and the light-emitting control module 22 is turned on in a case that the light-emitting control signal is at a low level; and a frequency of the light-emitting control signal is greater than 120 HZ.

When the display panel 10 displays each frame of image, each pixel drive circuit needs to go through three stages, which are a reset stage, a data write stage, and a light-emitting control stage respectively.

In the reset stage, the reset signal inputted at the reset signal terminal Reset is a valid signal, so that the second reset module 25 is turned on under control of the reset signal inputted at the reset signal terminal Reset. The second initialization signal inputted at the second initialization signal terminal Init2 is transmitted to a control terminal of the drive module 24 through the second reset module 25, and the control terminal of the drive module 24 is reset, thereby avoiding a charge remaining at the control terminal of the drive module 24 when a previous frame of image is displayed, which affects display of the frame of image; and in addition, in the reset stage, the light-emitting control signal inputted at the light-emitting control signal terminal EM is a valid signal for the first reset module 21, and the first reset module 21 is turned on under control of the light-emitting control signal inputted at the light-emitting control signal terminal EM. The first initialization signal inputted at the first initialization signal terminal Init1 is transmitted to the first terminal of the light-emitting device EL through the first reset module 21, to reset the first terminal of the light-emitting device EL, thereby avoiding a charge remaining at the first terminal of the light-emitting device EL when a previous frame of image is displayed, which affects display of the frame of image.

In this case, the first scan signal inputted at the first scan signal terminal Scan1 is an invalid signal, so that the data write module 23 is turned off; the second scan signal inputted at the second scan signal terminal Scan2 is also an invalid signal, so that the threshold compensation module 26 is also turned off; and the light-emitting control signal inputted at the light-emitting control signal terminal EM is an invalid signal for the light-emitting control module 22, so that the light-emitting control module 22 is also turned off.

It should be noted that in the reset stage, the drive module 24 is also in an on state, but because the light-emitting control module 22 is turned off, a drive current flowing into the first terminal of the light-emitting device EL is 0, and the light-emitting device EL does not emit light.

In the data write stage, the first scan signal inputted at the first scan signal terminal Scan1 is a valid signal, so that the data write module 23 is turned on under control of the first scan signal inputted at the first scan signal terminal Scan1. A data signal inputted at the data signal terminal Data is transmitted to the first terminal of the drive module 24 through the data write module 23; and in the data write stage, the second scan signal inputted at the second scan signal terminal Scan2 is a valid signal, so that the threshold compensation module 26 is turned on under control of the second scan signal inputted at the second scan signal terminal Scan2. Because the drive module 24 is also in an on state, a data signal written into the first terminal of the drive module 24 is written into the control terminal of the drive module 24 through the drive module 24 and the threshold compensation module 26. In addition, due to the existence of the threshold compensation module 26, the threshold compensation module 26 compensates for a threshold voltage of the drive module 24. Therefore, when the data signal is written into the control terminal of the drive module 24, the threshold voltage of the drive module 24 is also simultaneously written into the control terminal of the drive module 24. That is, the data signal inputted at the data signal terminal Data and the threshold voltage of the drive module 24 are written into the control terminal of the drive module 24 through the data write module 23 and the threshold compensation module 26.

Because the first terminal of the storage module 27 is connected to the first voltage signal terminal ELVDD, the second terminal of the storage module 27 is connected to the control terminal of the drive module 24. Therefore, when writing the data signal and the threshold voltage of the drive module 24 into the control terminal of the drive module 24, it is equivalent to storing the data signal and the threshold voltage of the drive module 24 in the storage module 27, and the storage module 27 may stabilize a voltage of the control terminal of the drive module 24, and prevent the voltage of the control terminal of the drive module 24 from decreasing due to the existence of a leakage current of the drive module 24.

In addition, in the data write stage, the light-emitting control signal inputted at the light-emitting control signal terminal EM is still a valid signal for the first reset module 21, and the first reset module 21 is turned on under control of the light-emitting control signal inputted at the light-emitting control signal terminal EM. The first initialization signal inputted at the first initialization signal terminal Init1 is transmitted to the first terminal of the light-emitting device EL through the first reset module 21, to continue to reset the first terminal of the light-emitting device EL.

In this case, the reset signal inputted at the reset signal terminal Reset is an invalid signal, so that the second reset module 25 is turned off, and the light-emitting control signal inputted at the light-emitting control signal terminal EM is still an invalid signal for the light-emitting control module 22, so that the light-emitting control module 22 is also turned off.

It should be noted that in the data write stage, the drive module 24 is also in an on state, but because the light-emitting control module 22 is turned off, a drive current flowing into the first terminal of the light-emitting device EL is 0, and the light-emitting device EL does not emit light.

In the light-emitting control stage, the light-emitting control signal inputted at the light-emitting control signal terminal EM is a valid signal for the light-emitting control module 22, and the light-emitting control module 22 is turned on under control of the light-emitting control signal inputted at the light-emitting control signal terminal EM. Because the drive module 24 is also in the on state, the light-emitting control module 22 may drive the light-emitting device EL through the drive module 24 to emit light.

In this case, the reset signal inputted at the reset signal terminal Reset is an invalid signal, so that the second reset module 25 is turned off; and the first scan signal inputted at the first scan signal terminal Scan1 is an invalid signal, so that the data write module 23 is turned off, the second scan signal inputted at the second scan signal terminal Scan2 is also an invalid signal, so that the threshold compensation module 26 is also turned off; and the light-emitting control signal inputted at the light-emitting control signal terminal EM is an invalid signal for the first reset module 21, so that the first reset module 21 is also turned off.

It should be noted that a valid signal refers to a signal that may control a corresponding module to be turned on, and an invalid signal refers to a signal that may control a corresponding module to be turned off. When a transistor in the module is an N-type transistor, the valid signal refers to a high-level signal, and the invalid signal refers to a low-level signal; and when a transistor in the module is a P-type transistor, the valid signal refers to a low-level signal, and the invalid signal refers to a high-level signal.

In summary, it may be learned that after connecting both the light-emitting control module 22 and the first reset module 21 that resets the light-emitting device EL to the light-emitting control signal terminal EM, one of the light-emitting control module 22 and the first reset module 21 is turned on when the light-emitting control signal is at the high level, and the other of the light-emitting control module 22 and the first reset module 21 is turned on when the light-emitting control signal is at the low level, so that when the light-emitting control module 22 is turned on, the first reset module 21 may be synchronously turned off, and when the light-emitting control module 22 is turned off, the first reset module 21 may be synchronously turned on.

When the light-emitting control module 22 is turned off, and the first reset module 21 is synchronously turned on, the first reset module 21 and the light-emitting control module 22 may reduce a voltage of the first terminal of the light-emitting device EL at the same frequency, so that the light-emitting control signal may reduce the brightness of the corresponding light-emitting device EL to 0 nits in each cycle; and in addition, when the frequency of the light-emitting control signal is increased to greater than 120 Hz, it has a better effect on improving the frequent flickering on the image during low-brightness display.

It should be noted that in the embodiments of this application, the first reset module 21 and the light-emitting control module 22 reduce the voltage of the first terminal of the light-emitting device EL to 0 nits at the same frequency. 0 nits refers to a value in an allowable range of error, not necessarily a specific value of 0 nits. For example, when the voltage at the first terminal of the light-emitting device EL is reduced to 0.1 nits in the allowable range of error, it also means by default reducing the voltage at the first terminal of the light-emitting device EL to 0 nits.

The light-emitting control module 22 includes a first light-emitting control unit 221 and a second light-emitting control unit 222. A control terminal of the first light-emitting control unit 221 is connected to the light-emitting control signal terminal EM, a first terminal of the first light-emitting control unit 221 is connected to a first voltage signal terminal ELVDD, and a second terminal of the first light-emitting control unit 221 is connected to a first terminal of the drive module 24; and a control terminal of the second light-emitting control unit 222 is connected to the light-emitting control signal terminal EM, a first terminal of the second light-emitting control unit 222 is connected to a second terminal of the drive module 24, and a second terminal of the second light-emitting control unit 222 is connected to the first terminal of the light-emitting device EL.

A specific structure and an operating process of the pixel drive circuit in the embodiments of this application are introduced below in two optional implementations.

Figure 6:
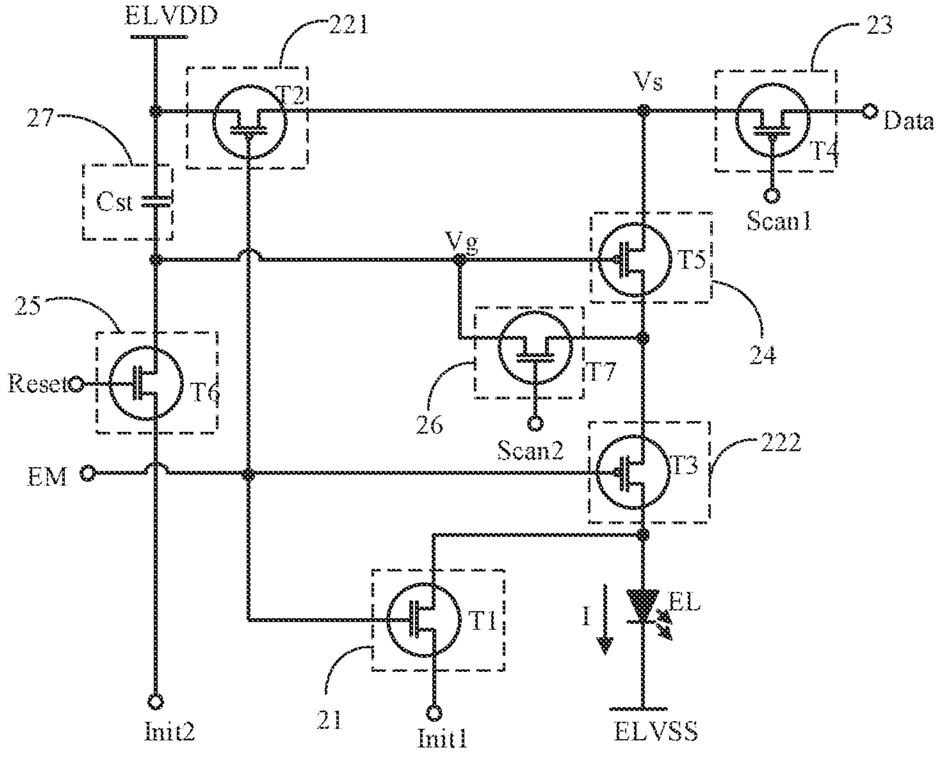
FIG. 6 is a circuit diagram of a pixel drive circuit according to an embodiment of this application.

In an optional implementation, as shown in FIG. 6, the first reset module 21 includes a first reset transistor T1, and the first light-emitting control unit 221 includes a first light-emitting control transistor T2. A second light-emitting control unit 222 includes a second light-emitting control transistor T3. The data write module 23 includes a data write transistor T4. The drive module 24 includes a drive transistor T5. The second reset module 25 includes a second reset transistor T6. The threshold compensation module 26 includes a compensation transistor T7, and the storage module 27 includes a storage capacitor Cst.

A gate of the first reset transistor T1 is connected to the light-emitting control signal terminal EM, a first electrode of the first reset transistor T1 is connected to the first initialization signal terminal Init1, and a second electrode of the first reset transistor T1 is connected to the first terminal of the light-emitting device EL.

A gate of the first light-emitting control transistor T2 is connected to the light-emitting control signal terminal EM, a first electrode of the first light-emitting control transistor T2 is connected to the first voltage signal terminal ELVDD, and a second electrode of the first light-emitting control transistor T2 is connected to the first terminal of the drive module 24. The control terminal of the first light-emitting control unit 221 refers to the gate of the first light-emitting control transistor T2. The first terminal of the first light-emitting control unit 221 refers to the first electrode of the first light-emitting control transistor T2. The second terminal of the first light-emitting control unit 221 refers to the second electrode of the first light-emitting control transistor T2. Specifically, the second electrode of the first light-emitting control transistor T2 is connected to the first electrode of the drive transistor T5. That is, the first terminal of the drive module 24 refers to the first electrode of the drive transistor T5.

A gate of the second light-emitting control transistor T3 is connected to the light-emitting control signal terminal EM, a first electrode of the second light-emitting control transistor T3 is connected to the second terminal of the drive module 24, and a second electrode of the second light-emitting control transistor T3 is connected to the first terminal of the light-emitting device EL. The control terminal of the second light-emitting control unit 222 refers to the gate of the second light-emitting control transistor T3. The first terminal of the second light-emitting control unit 222 refers to the first electrode of the second light-emitting control transistor T3. The second terminal of the second light-emitting control unit 222 refers to the second electrode of the second light-emitting control transistor T3. Specifically, the first electrode of the second light-emitting control transistor T3 is connected to the second electrode of the drive transistor T5. That is, the second terminal of the drive module 24 refers to the second electrode of the drive transistor T5.

A gate of the data write transistor T4 is connected to the first scan signal terminal Scan1. A first electrode of the data write transistor T4 is connected to the data signal terminal Data, and a second electrode of the data write transistor T4 is connected to the first terminal of the drive module 24. Specifically, the second electrode of the data write transistor T4 is connected to the first electrode of the drive transistor T5.

The gate of the drive transistor T5 is respectively connected to the second reset module 25, the second terminal of the storage module 27, and the threshold compensation module 26. The first electrode of the drive transistor T5 is connected to both the data write module 23 and the second terminal of the first light-emitting control unit 221. The second electrode of the drive transistor T5 is respectively connected to both the threshold compensation module 26 and the first terminal of the second light-emitting control unit 222. Specifically, the gate of the drive transistor T5 is respectively connected to the second electrode of the second reset transistor T6, the second electrode plate of the storage capacitor Cst, and the second electrode of the compensation transistor T7. The first electrode of the drive transistor T5 is respectively connected to the second electrode of the data write transistor T4 and the second electrode of the first light-emitting control transistor T2. The second electrode of the drive transistor T5 is respectively connected to the first electrode of the compensation transistor T7 and the first electrode of the second light-emitting control transistor T3. That is, the control terminal of the drive module 24 refers to the gate of the drive transistor T5.

The gate of the second reset transistor T6 is connected to the reset signal terminal Reset. The first electrode of the second reset transistor T6 is connected to the second initialization signal terminal Init2. The second electrode of the second reset transistor T6 is respectively connected to the second terminal of the storage module 27, the control terminal of the drive module 24, and the threshold compensation module 26. Specifically, the second electrode of the second reset transistor T6 is respectively connected to the second electrode plate of the storage capacitor Cst, the gate of the drive transistor T5, and the second electrode of the compensation transistor T7.

The gate of the compensation transistor T7 is connected to the second scan signal terminal Scan2. The first electrode of the compensation transistor T7 is respectively connected to the second terminal of the drive module 24 and the first terminal of the second light-emitting control unit 222. The second electrode of the compensation transistor T7 is respectively connected to the second terminal of the storage module 27, the control terminal of the drive module 24, and the second reset module 25. Specifically, the first electrode of the compensation transistor T7 is connected to the second electrode of the drive transistor T5 and the first electrode of the second light-emitting control transistor T3. The second electrode of the compensation transistor T7 is connected to the second electrode plate of the storage capacitor Cst, the gate of the drive transistor T5, and the second electrode of the second reset transistor T6.

The first electrode plate of the storage capacitor Cst is connected to the first voltage signal terminal ELVDD, and the second electrode plate of the storage capacitor Cst is respectively connected to the control terminal of the drive module 24, the second reset module 25, and the threshold compensation module 26. Specifically, the second electrode plate of the storage capacitor Cst is connected to the gate of the drive transistor T5, the second electrode of the second reset transistor T6, and the second electrode of the compensation transistor T7. The first terminal of the storage module 27 refers to the first electrode plate of the storage capacitor Cst, and the second terminal of the storage module 27 refers to the second electrode plate of the storage capacitor Cst.

In FIG. 6, the first reset transistor T1 is an N-type transistor, and both the first light-emitting control transistor T2 and the second light-emitting control transistor T3 are P-type transistors. Both the data write transistor T4 and the drive transistor T5 are P-type transistors, and both the second reset transistor T6 and the compensation transistor T7 are N-type transistors.

Figure 7:
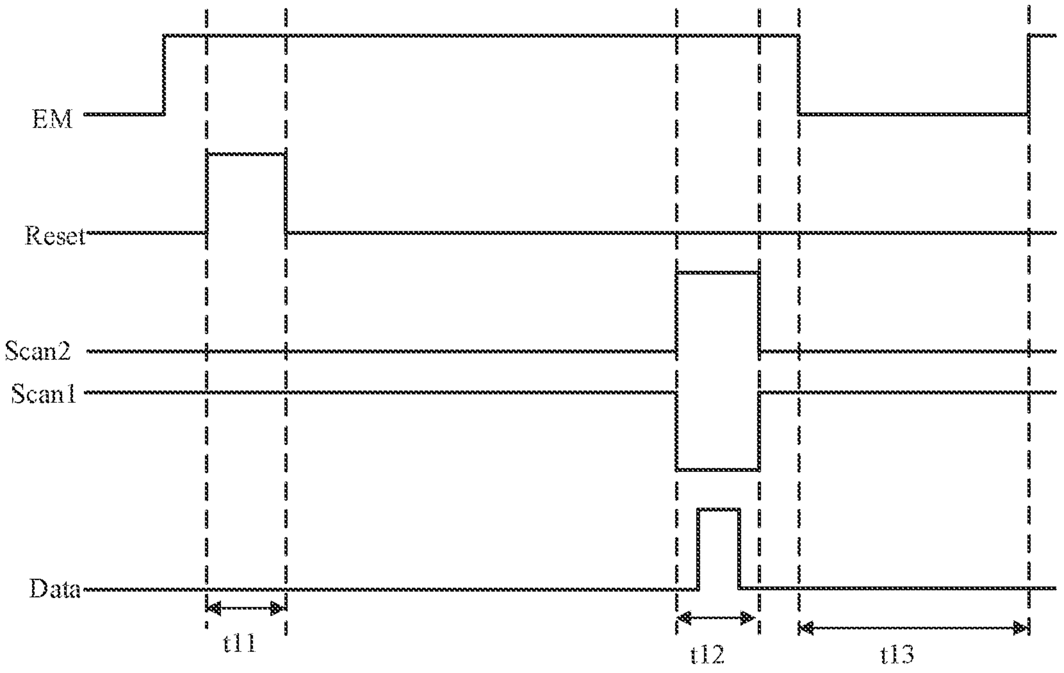
FIG. 7 is a drive timing diagram corresponding to the pixel drive circuit shown in FIG. 6.

A specific operating process of the pixel drive circuit shown in FIG. 6 is described below with reference to a timing diagram shown in FIG. 7.

In the reset stage t11, the reset signal inputted at the reset signal terminal Reset is at a high level, and in this case, the reset signal is a valid signal, so that the second reset transistor T6 is conducted under control of the reset signal inputted at the reset signal terminal Reset. The second initialization signal inputted at the second initialization signal terminal Init2 is transmitted to the gate of the drive transistor T5 (that is, a Vg node) through the second reset transistor T6, to reset the gate of the drive transistor T5, so that a gate voltage of the drive transistor T5 is adjusted to a second initialization voltage Vinit2 corresponding to the second initialization signal. For example, if the second initialization voltage Vinit2 corresponding to the second initialization signal is −3 V, after the second reset transistor T6 resets the gate of the drive transistor T5, a voltage of the gate of the drive transistor T5 (that is, the Vg node) may be adjusted to −3 V.

In addition, in the reset stage t11, the light-emitting control signal inputted at the light-emitting control signal terminal EM is at a high level, and in this case, the light-emitting control signal is a valid signal for the first reset transistor T1, so that the first reset transistor T1 is conducted under the control of the light-emitting control signal inputted at the light-emitting control signal terminal EM. The first initialization signal inputted at the first initialization signal terminal Init1 is transmitted to the first terminal of the light-emitting device EL through the first reset transistor T1, to reset the first terminal of the light-emitting device EL, so that the voltage of the first terminal of the light-emitting device EL is adjusted to a first initialization voltage Vinit1 corresponding to the first initialization signal.

Due to a light-emitting control stage in a previous frame of a display drive process, a voltage of the first electrode of the drive transistor T5 (that is, a voltage of a Vs node) is a voltage Vdd of the first voltage signal terminal ELVDD. Therefore, in the reset stage t11, the voltage of the Vs node is substantially equal to Vdd, and the first electrode of the drive transistor T5 refers to a source of the drive transistor T5. Because a voltage difference Vgs between the gate and the source of the drive transistor T5 is less than a threshold voltage Vth of the drive transistor T5, the drive transistor T5 is also in a conducted state.

In addition, in the reset stage t11, the first scan signal inputted at the first scan signal terminal Scan1 is at a high level, and in this case, the first scan signal is an invalid signal, so that the data write transistor T4 is turned off; the second scan signal inputted at the second scan signal terminal Scan2 is at a low level, and in this case, the second scan signal is also an invalid signal, so that the compensation transistor T7 is also in an off state; and the light-emitting control signal inputted at the light-emitting control signal terminal EM is at a high level, and in this case, the light-emitting control signal is an invalid signal for the first light-emitting control transistor T2 and the second light-emitting control transistor T3, so that the first light-emitting control transistor T2 and the second light-emitting control transistor T3 are also in the off state. A drive current flowing into the first terminal of the light-emitting device EL is 0, and the light-emitting device EL does not emit light.

In the data write stage t12, the first scan signal inputted at the first scan signal terminal Scan1 is at a low level, and in this case, the first scan signal is a valid signal, so that the data write transistor T4 is conducted. A data signal inputted at the data signal terminal Data is transmitted to the first electrode of the drive transistor T5 through the data write transistor T4, and in this case, the voltage of the Vs node is a data voltage Vdata corresponding to the data signal; and in the data write stage t12, the second scan signal inputted at the second scan signal terminal Scan2 is a high-level signal, and in this case, the second scan signal is a valid signal, so that the compensation transistor T7 is conducted. The data signal written into the first electrode of the drive transistor T5 is sequentially written into the gate of the drive transistor T5 through the drive transistor T5 and the compensation transistor T7. As the data signal is written, a gate voltage of the drive transistor T5 gradually increases until the gate voltage of the drive transistor T5 becomes Vdata+Vth, that is, a voltage of the Vg node is Vdata+Vth.

In addition, in the data write stage t12, the light-emitting control signal inputted at the light-emitting control signal terminal EM is still a high level, and in this case, the light-emitting control signal is still a valid signal for the first reset transistor T1, so that the first reset transistor T1 is conducted. The first initialization signal inputted at the first initialization signal terminal Init1 continues to be transmitted to the first terminal of the light-emitting device EL through the first reset transistor T1, and continues to reset the first terminal of the light-emitting device EL, so that the voltage of the first terminal of the light-emitting device EL is maintained at a first initialization voltage Vinit1.

In addition, in the data write stage t12, a reset signal inputted at the reset signal terminal Reset is at a low level, and in this case, the reset signal is an invalid signal, so that the second reset transistor T6 is turned off; and the light-emitting control signal inputted at the light-emitting control signal terminal EM is still a high level, and in this case, the light-emitting control signal is still an invalid signal for the first light-emitting control transistor T2 and the second light-emitting control transistor T3, so that the first light-emitting control transistor T2 and the second light-emitting control transistor T3 are also in the off state. A drive current flowing into the first terminal of the light-emitting device EL is 0, and the light-emitting device EL does not emit light.

In the light-emitting control stage t13, the light-emitting control signal inputted at the light-emitting control signal terminal EM is at a low level, and in this case, the light-emitting control signal is a valid signal for the first light-emitting control transistor T2 and the second light-emitting control transistor T3, so that the first light-emitting control transistor T2 and the second light-emitting control transistor T3 are conducted under control of the light-emitting control signal inputted at the light-emitting control signal terminal EM. In addition, because the first light-emitting control transistor T2 is conducted, the voltage of the Vs node changes from Vdata to Vdd, the voltage of the Vg node is Vdata+Vth, and Vgs is less than 0. In this way, the drive transistor T5 continues to be maintained in the conducted state, and then a drive current I flowing into the light-emitting device $EL=K(Vgs-Vth)^2=K(Vdata+Vth-Vdd-Vth)^2=K(Vdata-Vdd)^2$. K is a constant, and a specific value is determined by characteristics of the drive transistor T5. It may be learnt that the drive current flowing into the light-emitting device EL is unrelated to a threshold voltage Vth of the drive transistor T5. Through the compensation transistor T7, the drive current flowing into the light-emitting device EL may be unrelated to the threshold voltage Vth of the drive transistor T5, thereby avoiding fluctuations in the threshold voltage Vth of the drive transistor T5 from affecting light-emitting brightness of the light-emitting device EL, and improving brightness uniformity of the display panel.

In the light-emitting control stage t13, a reset signal inputted at the reset signal terminal Reset is at a low level, and in this case, the reset signal is an invalid signal, so that the second reset transistor T6 is turned off; the first scan signal inputted at the first scan signal terminal Scan1 is at a high level, and in this case, the first scan signal is an invalid signal, so that the data write transistor T4 is turned off; the second scan signal inputted at the second scan signal terminal Scan2 is at a low level, and in this case, the second scan signal is also an invalid signal, so that the compensation transistor T7 is also in an off state; and the light-emitting control signal inputted at the light-emitting control signal terminal EM is at a low level, and in this case, the light-emitting control signal is an invalid signal for the first reset transistor T1, so that the first reset transistor T1 is turned off.

Therefore, it may be learned that for the pixel drive circuit shown in FIG. 6, when the gate of the first reset transistor T1, the gate of the first light-emitting control transistor T2, and the gate of the second light-emitting control transistor T3 are all connected to the light-emitting control signal terminal EM, in the reset stage t11 and the data write stage t12, the light-emitting control signal is at a high level, so that the first reset transistor T1 is in the conducted state, while the first light-emitting control transistor T2 and the second light-emitting control transistor T3 are in the off state. In the light-emitting control stage t13, the light-emitting control signal is at a low level, so that the first reset transistor T1 is in the off state, and the first light-emitting control transistor T2 and the second light-emitting control transistor T3 are in the conducted state.

That is, while the first light-emitting control transistor T2 and the second light-emitting control transistor T3 are in the off state, the first reset transistor T1 is in the conducted state. The first reset transistor T1, the first light-emitting control transistor T2, and the second light-emitting control transistor T3 may reduce a voltage of the first terminal of the light-emitting device EL at the same frequency; and in addition, when the frequency of the light-emitting control signal is increased to greater than 120 HZ, the phenomenon of frequent flickering on the image during low-brightness display may be effectively improved.

It should be noted that in the reset stage t111 and the data write stage t12, there is an interval of a specific duration. The reason is that a reset signal terminal Reset of the pixel drive circuit in an $n^{th}$ row is connected to a second scan signal terminal Scan2 of the pixel drive circuit in an n-$7^{th}$ row. Therefore, a time period between the reset stage t11 and the data write stage t12 refers to a reset stage t11 corresponding to the pixel drive circuit in an n-$6^{th}$ row to the pixel drive circuit in an n-$1^{th}$ row; and in addition, there is also a short interval between the data write stage t12 and the light-emitting control stage t13, which is to ensure a sufficient time to stabilize a gate voltage of the drive transistor T5 at Vdata+Vth.

Figure 8:
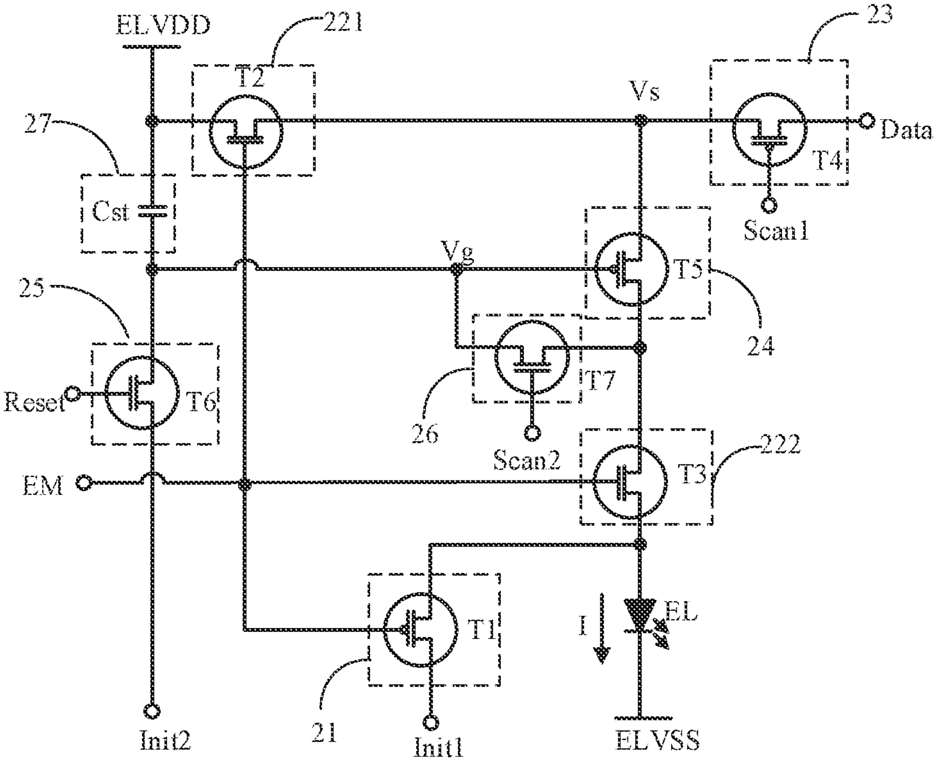
FIG. 8 is a circuit diagram of another pixel drive circuit according to an embodiment of this application.

In another optional implementation, as shown in FIG. 8, the first reset module 21 includes a first reset transistor T1, and the first light-emitting control unit 221 includes a first light-emitting control transistor T2. A second light-emitting control unit 222 includes a second light-emitting control transistor T3. The data write module 23 includes a data write transistor T4. The drive module 24 includes a drive transistor T5. The second reset module 25 includes a second reset transistor T6. The threshold compensation module 26 includes a compensation transistor T7, and the storage module 27 includes a storage capacitor Cst.

A connection relationship of the first reset transistor T1, the first light-emitting control transistor T2, the second light-emitting control transistor T3, the data write transistor T4, the drive transistor T5, the second reset transistor T6, the compensation transistor T7, and the storage capacitor Cst in FIG. 8 is the same as a connection relationship of the first reset transistor T1, the first light-emitting control transistor T2, the second light-emitting control transistor T3, the data write transistor T4, the drive transistor T5, the second reset transistor T6, and the compensation transistor T7, and the storage capacitor Cst in FIG. 6, and is not repeated herein to avoid repetition.

A difference is that in FIG. 8, the first reset transistor T1 is a P-type transistor, and both the first light-emitting control transistor T2 and the second light-emitting control transistor T3 are N-type transistors.

In addition, in FIG. 8, both the data write transistor T4 and the drive transistor T5 are P-type transistors, and both the second reset transistor T6 and the compensation transistor T7 are N-type transistors.

Figure 9:
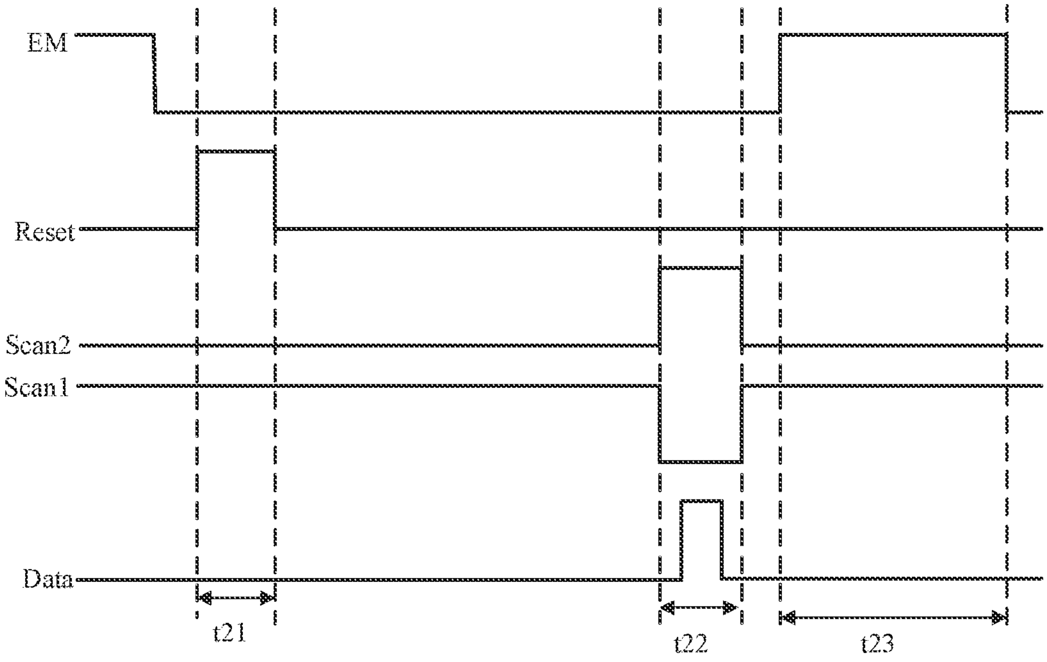
FIG. 9 is a drive timing diagram corresponding to the pixel drive circuit shown in FIG. 8.

A specific operating process of the pixel drive circuit shown in FIG. 8 is described below with reference to a timing diagram shown in FIG. 9.

In the reset stage t21, the reset signal inputted at the reset signal terminal Reset is at a high level, so that the second reset transistor T6 is conducted. The second initialization signal inputted at the second initialization signal terminal Init2 is transmitted to the gate of the drive transistor T5 (that is, a Vg node) through the second reset transistor T6, to reset the gate of the drive transistor T5. The light-emitting control signal inputted at the light-emitting control signal terminal EM is at a low level, and in this case, the light-emitting control signal is a valid signal for the first reset transistor T1, so that the first reset transistor T1 is conducted under control of the light-emitting control signal inputted at the light-emitting control signal terminal EM. The first initialization signal inputted at the first initialization signal terminal Init1 is transmitted to the first terminal of the light-emitting device EL through the first reset transistor T1, to reset the first terminal of the light-emitting device EL.

In addition, in the reset stage t21, because the voltage of the first electrode of the drive transistor T5 is substantially equal to the voltage Vdd of the first voltage signal terminal ELVDD, a voltage difference between the gate and the source of the drive transistor T5 is less than a threshold voltage Vth of the drive transistor T5, and the drive transistor T5 is also in a conducted state; in the reset stage t21, the first scan signal inputted at the first scan signal terminal Scan1 is at a high level, so that the data write transistor T4 is turned off; the second scan signal inputted at the second scan signal terminal Scan2 is at a low level, so that the compensation transistor T7 is also in an off state; and the light-emitting control signal inputted at the light-emitting control signal terminal EM is at a low level, and in this case, the light-emitting control signal is an invalid signal for the first light-emitting control transistor T2 and the second light-emitting control transistor T3, so that the first light-emitting control transistor T2 and the second light-emitting control transistor T3 are also in the off state. A drive current flowing into the first terminal of the light-emitting device EL is 0, and the light-emitting device EL does not emit light.

In the data write stage t22, the first scan signal inputted at the first scan signal terminal Scan1 is at a low level, so that the data write transistor T4 is conducted. The second scan signal inputted at the second scan signal terminal Scan2 is a high-level signal, so that the compensation transistor T7 is conducted. The data signal inputted at the data signal terminal Data is sequentially written into the gate of the drive transistor T5 through the data write transistor T4, the drive transistor T5, and the compensation transistor T7. As the data signal is written, a gate voltage of the drive transistor T5 gradually increases until the gate voltage of the drive transistor T5 becomes Vdata+Vth, that is, a voltage of the Vg node is Vdata+Vth.

In addition, in the data write stage t22, the light-emitting control signal inputted at the light-emitting control signal terminal EM is at a low level, and in this case, the light-emitting control signal is still a valid signal for the first reset transistor T1, so that the first reset transistor T1 is conducted. The first initialization signal inputted at the first initialization signal terminal Init1 continues to be transmitted to the first terminal of the light-emitting device EL through the first reset transistor T1, and continues to reset the first terminal of the light-emitting device EL.

In addition, in the data write stage t22, a reset signal inputted at the reset signal terminal Reset is at a low level, so that the second reset transistor T6 is turned of, and the light-emitting control signal inputted at the light-emitting control signal terminal EM is still a low level, and in this case, the light-emitting control signal is still an invalid signal for the first light-emitting control transistor T2 and the second light-emitting control transistor T3, so that the first light-emitting control transistor T2 and the second light-emitting control transistor T3 are also in the off state. A drive current flowing into the first terminal of the light-emitting device EL is 0, and the light-emitting device EL does not emit light.

In the light-emitting control stage t23, the light-emitting control signal inputted at the light-emitting control signal terminal EM is at a high level, and in this case, the light-emitting control signal is a valid signal for the first light-emitting control transistor T2 and the second light-emitting control transistor T3, so that the first light-emitting control transistor T2 and the second light-emitting control transistor T3 are conducted under the action of the light-emitting control signal inputted at the light-emitting control signal terminal EM. A voltage of the Vs node is changed from Vdata to Vdd, a voltage of the Vg node is Vdata+Vth, and Vgs is less than 0, so that the drive transistor T5 continues to be maintained in the conducted state. The drive current I flowing into the light-emitting device EL=K $(Vdata-Vdd)^2$, the drive current flowing into the light-emitting device EL is unrelated to the threshold voltage Vth of the drive transistor T5.

In the light-emitting control stage t23, a reset signal inputted at the reset signal terminal Reset is at a low level, so that the second reset transistor T6 is turned off; the first scan signal inputted at the first scan signal terminal Scan1 is at a high level, so that the data write transistor T4 is turned off; the second scan signal inputted at the second scan signal terminal Scan2 is at a low level, so that the compensation transistor T7 is also in an off state; and the light-emitting control signal inputted at the light-emitting control signal terminal EM is at a high level, and in this case, the light-emitting control signal is an invalid signal for the first reset transistor T1, so that the first reset transistor T1 is turned off.

Therefore, it may be learned that for the pixel drive circuit shown in FIG. 8, when the gate of the first reset transistor T1, the gate of the first light-emitting control transistor T2, and the gate of the second light-emitting control transistor T3 are all connected to the light-emitting control signal terminal EM, in the reset stage t21 and the data write stage t22, the light-emitting control signal is at a low level, so that the first reset transistor T1 is in the on state, while the first light-emitting control transistor T2 and the second light-emitting control transistor T3 are in the off state. In the light-emitting control stage t23, the light-emitting control signal is at a high level, so that the first reset transistor T1 is in the off state, and the first light-emitting control transistor T2 and the second light-emitting control transistor T3 are in the on state.

That is, while the first light-emitting control transistor T2 and the second light-emitting control transistor T3 are in the off state, the first reset transistor T1 is in the conducted state. The first reset transistor T1, the first light-emitting control transistor T2, and the second light-emitting control transistor T3 may reduce a voltage of the first terminal of the light-emitting device EL at the same frequency; and in addition, when the frequency of the light-emitting control signal is increased to greater than 120 HZ, the phenomenon of frequent flickering on the image during low-brightness display may be effectively improved.

It should be noted that a reset signal terminal Reset of the pixel drive circuit in the $n^{th}$ row is connected to a second scan signal terminal Scan2 of the pixel drive circuit in the n-$7^{th}$ row. Therefore, a time period between the reset stage 21 and the data write stage t22 refers to a reset stage t11 corresponding to the pixel drive circuit in the n-$6^{th}$ row to the pixel drive circuit in the n-$1^{th}$ row; and in addition, there is also a short interval between the data write stage t22 and the light-emitting control stage t23, which is to ensure a sufficient time to stabilize a gate voltage of the drive transistor T5 at Vdata+Vth.

Figure 10:
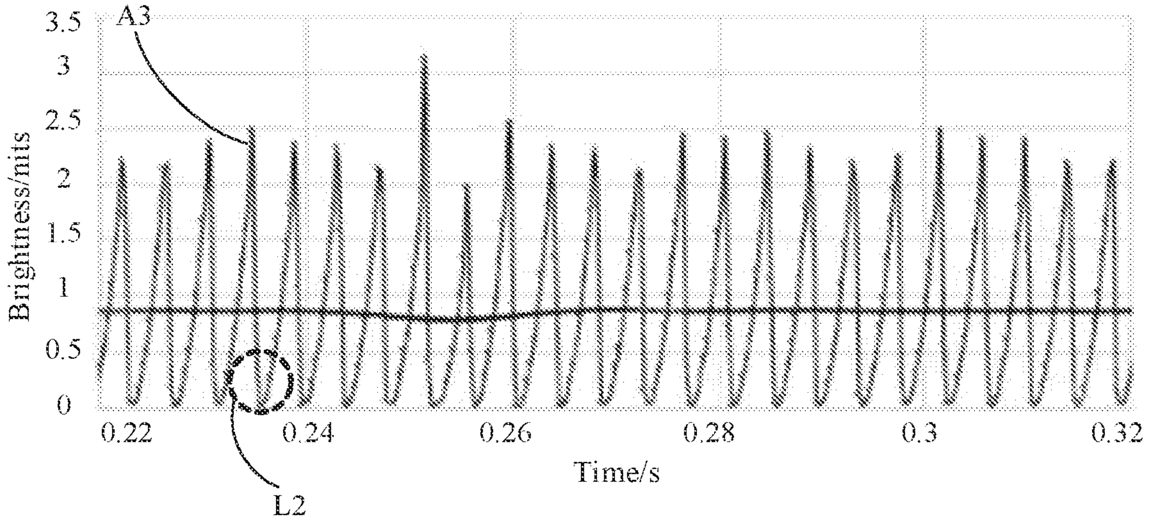
FIG. 10 is a schematic diagram of a brightness curve when a pixel drive circuit in an embodiment of this application drives a light-emitting device to emit light.

FIG. 10 is a schematic diagram of a brightness curve when a pixel drive circuit of an embodiment of this application drives a light-emitting device to emit light. A horizontal coordinate represents time in a unit of s, and a vertical coordinate represents brightness in a unit of nits. A test condition is that the gate of the first reset transistor T1, the gate of the first light-emitting control transistor T2, and the gate of the second light-emitting control transistor T3 are all connected to the light-emitting control signal terminal EM. The first reset transistor T1 is an N-type transistor, both the first light-emitting control transistor T2 and the second light-emitting control transistor T3 are P-type transistors, and a frequency of the light-emitting control signal inputted at the light-emitting control signal terminal EM is 240 Hz.

After testing, as shown in FIG. 10, at a moment A3, the light-emitting control signal changes from the low level to the high level, so that the first reset transistor T1 changes from the off state to the conducted state, and the first light-emitting control transistor T2 and the second light-emitting control transistor T3 simultaneously change from the conducted state to the off state. Through the first reset transistor T1, the first light-emitting control transistor T2, and the second light-emitting control transistor T3, the voltage of the first terminal of the light-emitting device EL is reduced at the same frequency to reduce brightness of the light-emitting device EL, so that in this case, the brightness L2 of the light-emitting device EL may be reduced to 0 nits. Therefore, in two adjacent periods of the light-emitting control signal, reduced brightness of the corresponding light-emitting device EL is basically the same.

Correspondingly, when the gate of the first reset transistor T1, the gate of the first light-emitting control transistor T2, and the gate of the second light-emitting control transistor T3 are all connected to the light-emitting control signal terminal EM, and the first reset transistor T1 is the P-type transistor, and the first light-emitting control transistor T2 and the second light-emitting control transistor T3 are the N-type transistors, the first reset transistor T1, the first light-emitting control transistor T2, and the second light-emitting control transistor T3 may also reduce the voltage of the first terminal of the light-emitting device EL at the same frequency, to reduce the brightness of the light-emitting device EL, so that the reduced brightness of the corresponding light-emitting device EL is basically the same in two adjacent periods of the light-emitting control signal.

Because the frequency of the light-emitting control signal inputted into the light-emitting control signal terminal EM is increased to 240 HZ, and the first reset transistor T1, the first light-emitting control transistor T2, and the second light-emitting control transistor T3 reduce the brightness of the light-emitting device EL to 0 nits at the same frequency, a change frequency of a bright state and a change frequency of a dark state of the light-emitting device EL may also be increased to 240 HZ. Correspondingly, the change frequency of the bright state and the change frequency of the dark state of the light-emitting device EL when displaying a frame of image is increased, so as to improve the problem of the phenomenon of frequent flickering on the image during low-brightness display.

In addition, because the gate of the first reset transistor T1, the gate of the first light-emitting control transistor T2, and the gate of the second light-emitting control transistor T3 are all connected to the light-emitting control signal terminal EM. The first reset transistor T1, the first light-emitting control transistor T2, and the second light-emitting control transistor T3 may be simultaneously controlled by one signal. The first reset transistor T1 is controlled by one signal, while the first light-emitting control transistor T2 and the second light-emitting control transistor T3 are controlled by another signal. In this embodiment of this application, a quantity of signals inputted into each pixel drive circuit may be reduced. Correspondingly, a quantity of signal lines required for transmitting signals is reduced, and a wiring design of a display panel is simplified.

It may be understood that the data write transistor T4 may also be the N-type transistor, the second reset transistor T6 may also be the P-type transistor, and the compensation transistor T7 may also be the P-type transistor. When types of the data write transistor T4, the second reset transistor T6, and the compensation transistor T7 are changed, a signal inputted into a signal terminal connected to the gate is also reversed. For example, when the data write transistor T4 becomes the N-type transistor, in the reset stage and the light-emitting control stage, the first scan signal inputted into the first scan signal terminal Scan1 becomes a low level. In the data write stage, the first scan signal inputted into the first scan signal terminal Scan1 becomes a high level.

It should be noted that in the embodiments of this application, the source and the drain of each transistor are interchangeable under specific conditions. Therefore, there is no difference in the description of the connection relationship between the source and the drain of each transistor. In the embodiments of this application, to distinguish the source and the dram of the transistor, one of the source and the drain is referred to as the first electrode, and the other electrode is referred to as the second electrode. In addition, according to characteristics of transistors, the transistors may be classified into an N-type transistor and a P-type transistor. For the N-type transistor, the first electrode is a source of the N-type transistor, and the second electrode is a drain of the N-type transistor. The gate is conducted when a high level is inputted into the gate, and for the P-type transistor, the gate is conducted when a low level is inputted into the gate.

In addition, the first reset transistor T1, the first light-emitting control transistor T2, the second light-emitting control transistor T3, the data write transistor T4, the drive transistor T5, the second reset transistor T6, and the compensation transistor T7 may be oxide semiconductor transistors or low temperature polysilicon transistors.

In the description, the frequency of the light-emitting control signal is increased from 120 Hz to 240 HZ to improve the problem of the phenomenon of frequent flickering on the image during low-brightness display. It may be understood that the frequency of the light-emitting control signal may also be increased to other frequencies, such as 150 HZ, 360 HZ, or the like. Provided that the frequency of the light-emitting control signal in the embodiments of this application is ensured to be greater than 120 HZ, the phenomenon of frequent flickering on the image during low-brightness display may be improved. When the frequency of the light-emitting control signal is higher, the effect of improving the problem of frequent flickering during low-brightness display is better.

In addition, in the foregoing description, the pixel drive circuit in the embodiments of this application is a 7T1C circuit. It may be understood that the pixel drive circuit in the embodiments of this application is not limited to the pixel drive circuit shown in FIG. 6 and FIG. 8, the pixel drive circuit may further be other types of pixel drive circuits, such as a 4T1C pixel drive circuit, a 5T1C pixel drive circuit, or a 6T1C pixel drive circuit. Provided that it is ensured that in the pixel drive circuit, the gate of the transistor included in the light-emitting control module 22 and the gate of the transistor included in the first reset module 21 are both connected to the light-emitting control signal terminal EM, and one of the transistor in the light-emitting control module 22 and the transistor in the first reset module 21 is conducted when the light-emitting control signal is at a high level, and the other is conducted when the light-emitting control signal is at a low level, both of which may be applied to this application.

For example, in this application, the 6T1C pixel drive circuit may also be used. Specifically, the second reset transistor T6 in the pixel drive circuit shown in FIG. 6 and FIG. 8 may be removed to obtain a 6T1C pixel drive circuit, and in this case, the pixel drive circuit does not include the second reset module 25.

Figure 11:
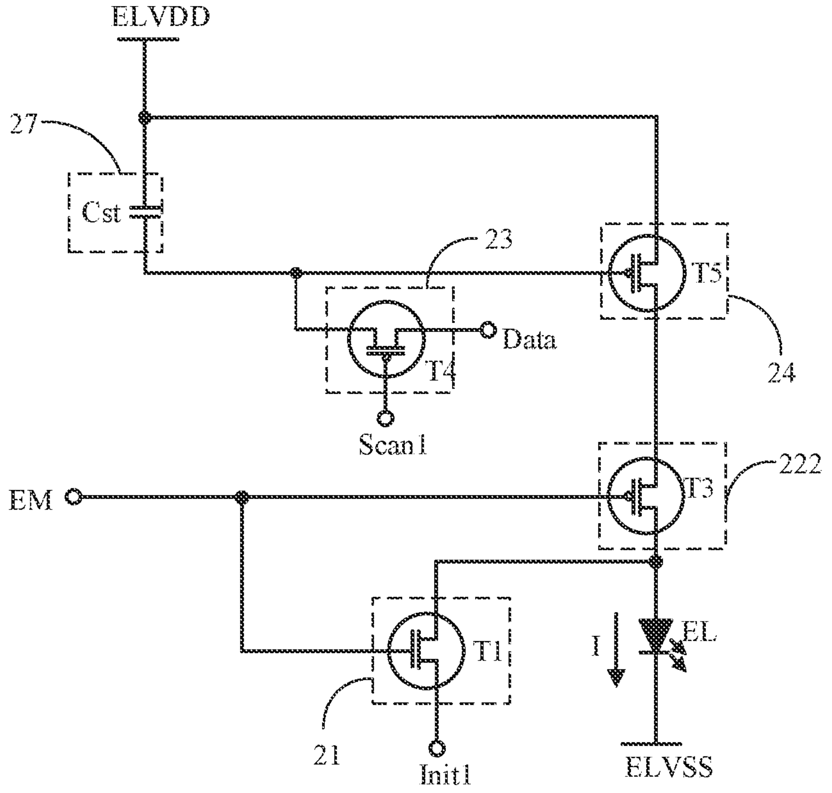
FIG. 11 is a circuit diagram of still another pixel drive circuit according to an embodiment of this application.

Alternatively, in this application, the 4T1C pixel drive circuit may further be used. Specifically, the second reset transistor T6, the compensation transistor T7, and the first light-emitting control transistor T2 in the pixel drive circuit shown in FIG. 6 may be removed to obtain a 4T1C pixel drive circuit as shown in FIG. 11. In this case, the pixel drive circuit includes the first reset transistor T1, the second light-emitting control transistor T3, the data write transistor T4, the drive transistor T5, and the storage capacitor Cst, but does not include the second reset module 25, the threshold compensation module 26, and the first light-emitting control unit 221; and in addition, the second electrode of the data write transistor T4 is connected to the gate of the drive transistor T5, and the first electrode of the drive transistor T5 is connected to the first voltage signal terminal ELVDD. When the light-emitting control module 22 includes the second light-emitting control unit 222 but does not include the first light-emitting control unit 221, a type of the first reset transistor T1 is opposite to a type of the second light-emitting control transistor T3. That is, when the first reset transistor T1 is the P-type transistor, the second light-emitting control transistor T3 is the N-type transistor, or when the first reset transistor T1 is the N-type transistor, the second light-emitting control transistor T3 is the P-type transistor.

Therefore, when the transistor included in the first reset module 21 is the N-type transistor, the transistor included in the light-emitting control module 22 is the P-type transistor; and when the transistor included in the first reset module 21 is the P-type transistor, the transistor included in the light-emitting control module 22 is the N-type transistor. The light-emitting control module may only include the second light-emitting control unit 222, or may include the first light-emitting control unit 22 and the second light-emitting control unit 222.

The embodiments of this application further provide a display panel, including a plurality of pixel drive circuits as shown in FIG. 6, FIG. 8, or FIG. 11, and a light-emitting device EL connected to each pixel drive circuit.

A first terminal of the light-emitting device EL refers to an anode of the light-emitting device EL, a second terminal of the light-emitting device EL refers to a cathode of the light-emitting device EL, and the second terminal of the light-emitting device EL is connected to the second voltage signal terminal ELVSS.

In the embodiments of this application, a reset signal terminal Reset of the pixel drive circuit in the $n^{th}$ row is connected to a second scan signal terminal Scan2 of the pixel drive circuit in the n-$7^{th}$ row, and n is a positive integer greater than 7.

Figure 12:
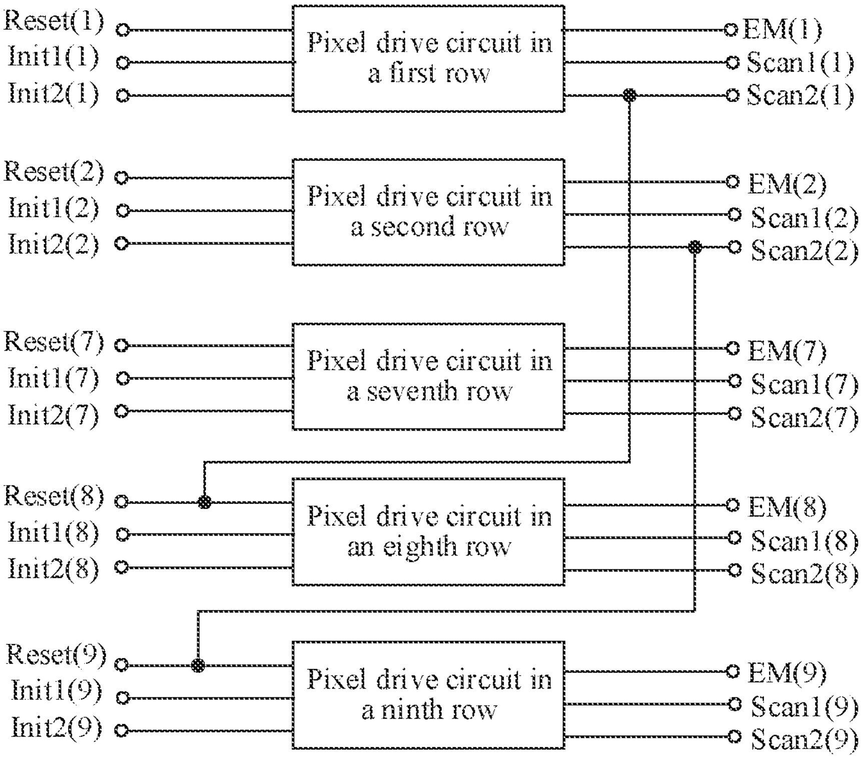
FIG. 12 is a cascaded relationship diagram of a pixel drive circuit in each row according to an embodiment of this application.

For example, as shown in FIG. 12, the pixel drive circuit in each row is respectively connected to the reset signal terminal Reset, the second initialization signal terminal Init2, the first initialization signal terminal Init1, the light-emitting control signal terminal EM, the first scan signal terminal Scan1, and the second scan signal terminal Scan2. The second scan signal terminal Scan2 of the pixel drive circuit in a first row is further connected to the reset signal terminal Reset of the pixel drive circuit in an eighth row. The second scan signal terminal Scan 2 of the pixel drive circuit in the second row is also connected to the reset signal terminal Reset of the pixel drive circuit in a ninth row, and so on. The reset signal terminal Reset of the pixel drive circuit in the first row to the pixel drive circuit in a seventh row needs to receive a reset signal inputted from the outside.

When a reset signal terminal Reset of the pixel drive circuit in the $n^{th}$ row is connected to a second scan signal terminal Scan2 of the pixel drive circuit in the n-$7^{th}$ row, the externally inputted reset signal may be reduced.

In addition, the display panel further includes a gate on array (gate on array, GOA) circuit, and the GOA circuit includes an EM GOA circuit, a first scan GOA circuit, and a second scan GOA circuit. The EM GOA circuit is connected to the light-emitting control signal terminal EM of the pixel drive circuit in each row, and is configured to input the light-emitting control signal into the light-emitting control signal terminal EM of the pixel drive circuit in each row. The first scan GOA circuit is connected to the first scan signal terminal Scan1 of the pixel drive circuit in each row, and is configured to input the first scan signal into the first scan signal terminal Scan1 of the pixel drive circuit in each row. The second scan GOA circuit is connected to the second scan signal terminal Scan2 of the pixel drive circuit in each row, and is configured to input a second scan signal into the second scan signal terminal Scan2 of the pixel drive circuit in each row.

Generally, the display panel includes a display area and a non-display area surrounding the display area. The pixel drive circuit and the light-emitting device EL are located in the display area, and the GOA circuits are all located in the non-display area.

The foregoing implementations, structural schematic diagrams, or simulation schematic diagrams are only schematic descriptions of technical solutions of this application, and a size ratio does not constitute a limit to a protection scope of the technical solution. Any modification, equivalent replacement, and improvement made within the spirit and principle of the implementations shall be included within the protection scope of the technical solutions.

What is claimed is:

1. A pixel drive circuit, configured to drive a light-emitting device to emit light, the pixel drive circuit comprising:

a first reset module respectively connected to a light-emitting control signal terminal, a first initialization signal terminal, and a first terminal of the light-emitting device, wherein the first reset module is configured to be turned on under control of a light-emitting control signal provided at the light-emitting control signal terminal, and to reset the first terminal of the light-emitting device through a first initialization signal provided at the first initialization signal terminal;

a drive module; and a light-emitting control module respectively connected to the light-emitting control signal terminal, the drive module, and the first terminal of the light-emitting device, wherein the light-emitting control module is configured to be turned on under control of the light-emitting control signal provided at the light-emitting control signal terminal, and to drive the light-emitting device through the drive module to emit light, wherein one of the first reset module and the light-emitting control module is turned on in a case that the light-emitting control signal is at a high level, and the other of the first reset module and the light-emitting control module is turned on in a case that the light-emitting control signal is at a low level, and wherein a frequency of the light-emitting control signal is greater than 120 Hertz (Hz).

2. The pixel drive circuit according to of claim 1, wherein the light-emitting control module comprises a first light-emitting control unit and a second light-emitting control unit, wherein a control terminal of the first light-emitting control unit is connected to the light-emitting control signal terminal, a first terminal of the first light-emitting control unit is connected to a first voltage signal terminal, and a second terminal of the first light-emitting control unit is connected to a first terminal of the drive module, and wherein a control terminal of the second light-emitting control unit is connected to the light-emitting control signal terminal, a first terminal of the second light-emitting control unit is connected to a second terminal of the drive module, and a second terminal of the second light-emitting control unit is connected to the first terminal of the light-emitting device.

3. The pixel drive circuit of claim 2, wherein the first reset module comprises a first reset transistor, a gate of the first reset transistor is connected to the light-emitting control signal terminal, a first electrode of the first reset transistor is connected to the first initialization signal terminal, and a second electrode of the first reset transistor is connected to the first terminal of the light-emitting device, wherein the first light-emitting control unit comprises a first light-emitting control transistor, a gate of the first light-emitting control transistor is connected to the light-emitting control signal terminal, a first electrode of the first light-emitting control transistor is connected to the first voltage signal terminal, and a second electrode of the first light-emitting control transistor is connected to the first terminal of the drive module, and wherein the second light-emitting control unit comprises a second light-emitting control transistor, a gate of the second light-emitting control transistor is connected to the light-emitting control signal terminal, a first electrode of the second light-emitting control transistor is connected to the second terminal of the drive module, and a second electrode of the second light-emitting control transistor is connected to the first terminal of the light-emitting device.

4. The pixel drive circuit of claim 3, wherein the first reset transistor is an N-type transistor, and both the first light-emitting control transistor and the second light-emitting control transistor are P-type transistors.

5. The pixel drive circuit of claim 3, wherein the first reset transistor is a P-type transistor, and both the first light-emitting control transistor and the second light-emitting control transistor are N-type transistors.

6. The pixel drive circuit of claim 2, wherein the drive module comprises a drive transistor, a first electrode of the drive transistor is connected to the second terminal of the first light-emitting control unit, and a second electrode of the drive transistor is connected to the first terminal of the second light-emitting control unit.

7. The pixel drive circuit of claim 1, further comprising:

a second reset module respectively connected to a reset signal terminal, a second initialization signal terminal, and a control terminal of the drive module, wherein the second reset module is configured to be turned on under control of a reset signal inputted provided at the reset signal terminal, and to reset the control terminal of the drive module through a second initialization signal provided at the second initialization signal terminal;

a data write module respectively connected to a first scan signal terminal, a data signal terminal, and a first terminal of the drive module, wherein the data write module is configured to be turned on under control of a first scan signal provided at the first scan signal terminal, and to write a data signal provided at the data signal terminal to the drive module;

a threshold compensation module respectively connected to a second scan signal terminal, a second terminal of the drive module, and the control terminal of the drive module, wherein the threshold compensation module is configured to be turned on under control of a second scan signal provided at the second scan signal terminal, and to compensate for a threshold voltage of the drive module; and a storage module respectively connected to a first voltage signal terminal and the control terminal of the drive module, [[and]] wherein the storage module is configured to stabilize a voltage of the control terminal of the drive module.

8. The pixel drive circuit of claim 7, wherein the data write module comprises a data write transistor, a gate of the data write transistor is connected to the first scan signal terminal, a first electrode of the data write transistor is connected to the data signal terminal, and a second electrode of the data write transistor is connected to the first terminal of the drive module.

9. The pixel drive circuit of claim 7, wherein the second reset module comprises a second reset transistor, a gate of the second reset transistor is connected to the reset signal terminal, a first electrode of the second reset transistor is connected to the second initialization signal terminal, and a second electrode of the second reset transistor is connected to the control terminal of the drive module.

10. The pixel drive circuit of claim 7, wherein the threshold compensation module comprises a compensation transistor, a gate of the compensation transistor is connected to the second scan signal terminal, a first electrode of the compensation transistor is connected to the second terminal of the drive module, and a second electrode of the compensation transistor is connected to the control terminal of the drive module.

11. The pixel drive circuit of claim 7, wherein the storage module comprises a storage capacitor, a first electrode plate of the storage capacitor is connected to the first voltage signal terminal, and a second electrode plate of the storage capacitor is connected to the control terminal of the drive module.

12. A method for driving the pixel drive circuit of claim 1, the method comprising:

turning on, in a reset stage, a first reset module to reset a first terminal of the light-emitting device;

turning on, in a data write stage, the first reset module to continue to reset the first terminal of the light-emitting device; and turning on, in a light-emitting control stage, a light-emitting control module, and driving the light-emitting device through a drive module to emit light.

13. A display panel, comprising:

a light-emitting device; and a pixel drive circuit connected to the light-emitting device and configured to drive the light-emitting device to emit light, wherein the pixel drive circuit comprises:

a first reset module respectively connected to a light-emitting control signal terminal, a first initialization signal terminal, and a first terminal of the light-emitting device, wherein the first reset module is configured to be turned on under control of a light-emitting control signal provided at the light-emitting control signal terminal, and to reset the first terminal of the light-emitting device through a first initialization signal provided at the first initialization signal terminal;

a drive module; and a light-emitting control module respectively connected to the light-emitting control signal terminal, the drive module, and the first terminal of the light-emitting device, wherein the light-emitting control module is configured to be turned on under control of the light-emitting control signal provided at the light-emitting control signal terminal, and to drive the light-emitting device through the drive module to emit light, wherein one of the first reset module and the light-emitting control module is turned on in a case that the light-emitting control signal is at a high level, and the other of the first reset module and the light-emitting control module is turned on in a case that the light-emitting control signal is at a low level, and wherein a frequency of the light-emitting control signal is greater than 120 Hertz (Hz).

14. The display panel of claim 13, wherein the light-emitting control module comprises a first light-emitting control unit and a second light-emitting control unit, wherein a control terminal of the first light-emitting control unit is connected to the light-emitting control signal terminal, a first terminal of the first light-emitting control unit is connected to a first voltage signal terminal, and a second terminal of the first light-emitting control unit is connected to a first terminal of the drive module, and wherein a control terminal of the second light-emitting control unit is connected to the light-emitting control signal terminal, a first terminal of the second light-emitting control unit is connected to a second terminal of the drive module, and a second terminal of the second light-emitting control unit is connected to the first terminal of the light-emitting device.

15. The display panel of claim 14, wherein the first reset module comprises a first reset transistor, a gate of the first reset transistor is connected to the light-emitting control signal terminal, a first electrode of the first reset transistor is connected to the first initialization signal terminal, and a second electrode of the first reset transistor is connected to the first terminal of the light-emitting device, wherein the first light-emitting control unit comprises a first light-emitting control transistor, a gate of the first light-emitting control transistor is connected to the light-emitting control signal terminal, a first electrode of the first light-emitting control transistor is connected to the first voltage signal terminal, and a second electrode of the first light-emitting control transistor is connected to the first terminal of the drive module, and wherein the second light-emitting control unit comprises a second light-emitting control transistor, a gate of the second light-emitting control transistor is connected to the light-emitting control signal terminal, a first electrode of the second light-emitting control transistor is connected to the second terminal of the drive module, and a second electrode of the second light-emitting control transistor is connected to the first terminal of the light-emitting device.

16. The display panel of claim 14, wherein the drive module comprises a drive transistor, a first electrode of the drive transistor is connected to the second terminal of the first light-emitting control unit, and a second electrode of the drive transistor is connected to the first terminal of the second light-emitting control unit.

17. The display panel of claim 13, further comprising:

a second reset module respectively connected to a reset signal terminal, a second initialization signal terminal, and a control terminal of the drive module, wherein the second reset module is configured to be turned on under control of a reset signal provided at the reset signal terminal, and to reset the control terminal of the drive module through a second initialization signal provided at the second initialization signal terminal;

a data write module respectively connected to a first scan signal terminal, a data signal terminal, and a first terminal of the drive module, wherein the data write module is configured to be turned on under control of a first scan signal provided at the first scan signal terminal, and to write a data signal provided at the data signal terminal to the drive module;

a threshold compensation module respectively connected to a second scan signal terminal, a second terminal of the drive module, and the control terminal of the drive module, wherein the threshold compensation module is configured to be turned on under control of a second scan signal provided at the second scan signal terminal, and to compensate for a threshold voltage of the drive module; and a storage module respectively connected to a first voltage signal terminal and the control terminal of the drive module, wherein the storage module is configured to stabilize a voltage of the control terminal of the drive module.

18. The display panel of claim 17, wherein the data write module comprises a data write transistor, a gate of the data write transistor is connected to the first scan signal terminal, a first electrode of the data write transistor is connected to the data signal terminal, and a second electrode of the data write transistor is connected to the first terminal of the drive module.

19. The display panel of claim 17, wherein the second reset module comprises a second reset transistor, a gate of the second reset transistor is connected to the reset signal terminal, a first electrode of the second reset transistor is connected to the second initialization signal terminal, and a second electrode of the second reset transistor is connected to the control terminal of the drive module.

20. The display panel of claim 17, wherein the threshold compensation module comprises a compensation transistor, a gate of the compensation transistor is connected to the second scan signal terminal, a first electrode of the compensation transistor is connected to the second terminal of the drive module, and a second electrode of the compensation transistor is connected to the control terminal of the drive module.

* * * * *